Figure 1:
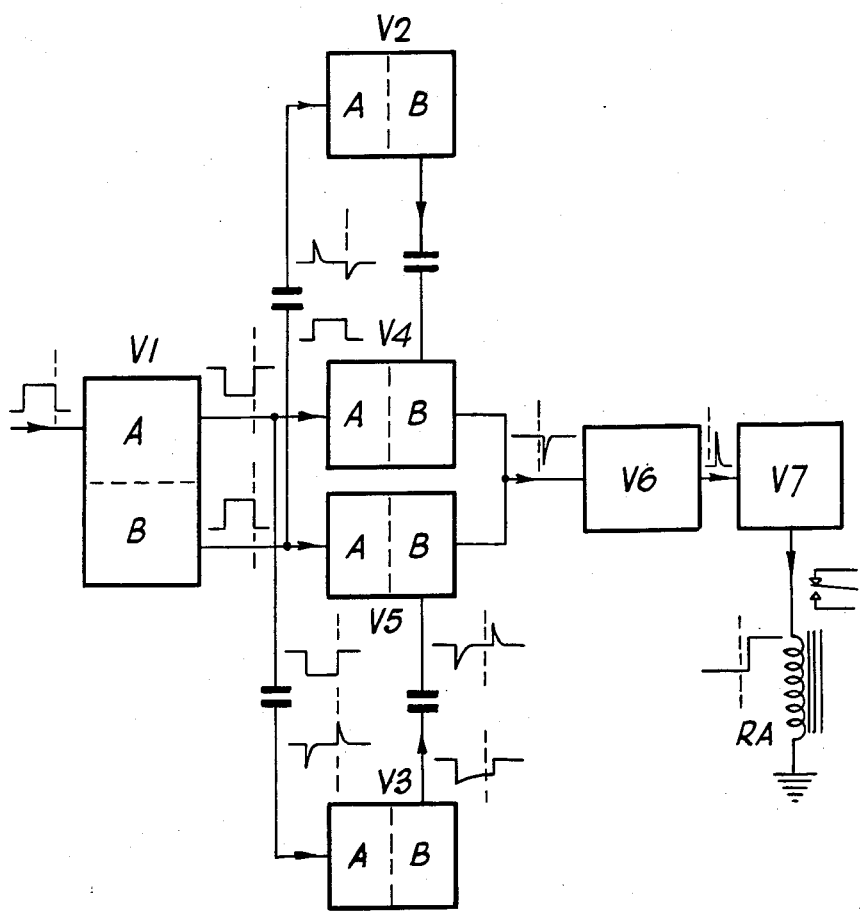

May 23, 1961 R. A. DAY, JR 2,985,716
PULSE DISTORTION DETECTING EQUIPMENT
Filed Feb. 14, 1958 3 Sheets—Sheet 1

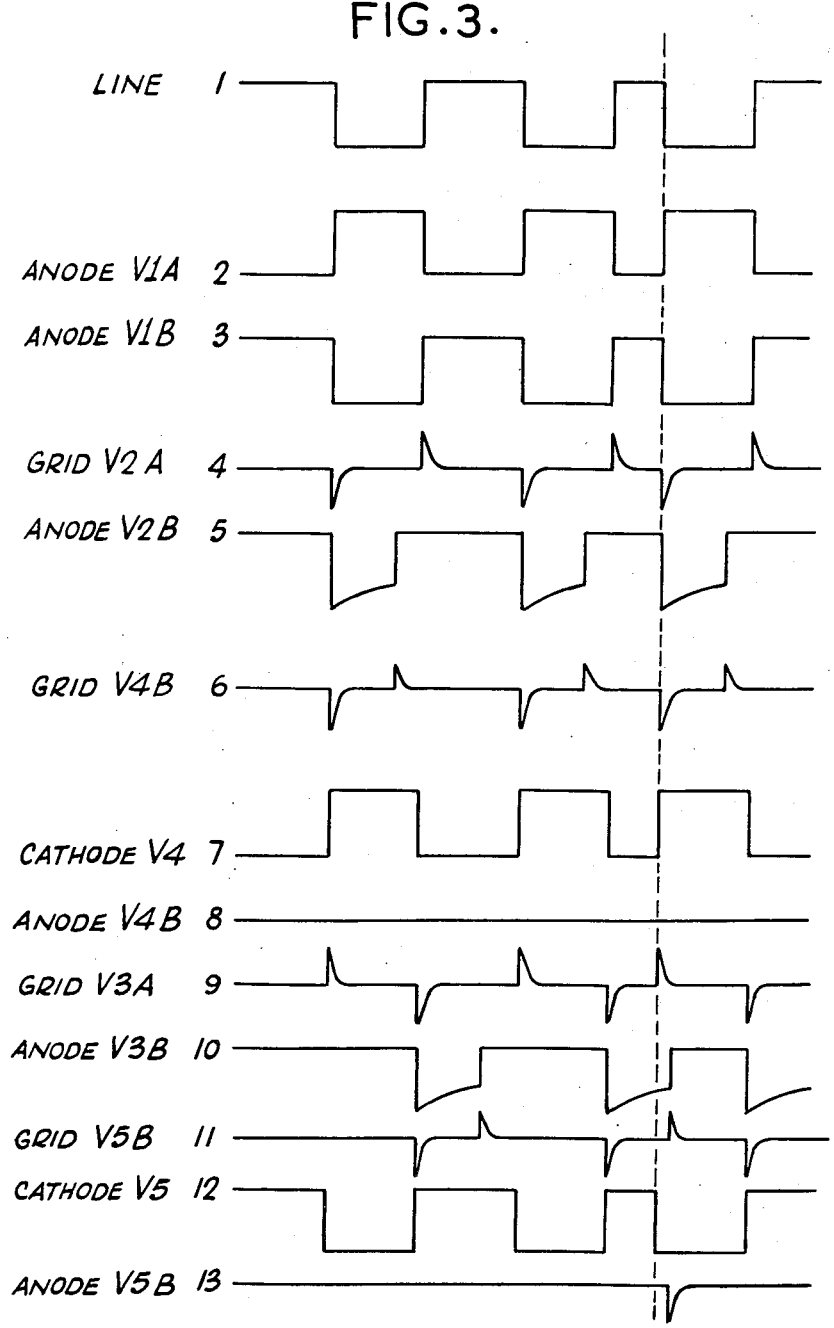

_United States Patent Office_

2,985,716
Patented May 23, 1961

2,985,716

PULSE DISTORTION DETECTING EQUIPMENT

Richard A. Day, Jr., Washington, D.C., assignor to British Telecommunications Research Limited, Taplow, England, a British company Filed Feb. 14, 1958, Ser. No. 715,384

Claims priority, application Great Britain Feb. 18, 1957

5 Claims. (Cl. 178—69)

The present invention relates to pulse distortion detecting equipment and is particularly concerned with signalling systems such as those normally used for teleprinter operation.

It is well known that where signalling of this character takes place over long lines, there is a danger that the signals will become distorted in that the different pulses become unduly shortened or lengthened. It is known to provide regenerating equipment in order to correct this distortion but there are limits to the capabilities of the regenerator and circumstances may occur in which, though the regenerator produces perfectly formed signals, they do not correspond to the signals originally transmitted and are probably unintelligible. If the message in question is in code, it will almost certainly be impossible for the operator to detect that incorrect operation is occurring and a considerable number of meaningless characters might therefore be transmitted before it was appreciated that the circuit was not functioning properly.

The chief object of the present invention is to give an immediate warning if the transmission characteristics have deteriorated to such an extent that correct signals are not being received so that suitable action can be taken before any considerable amount of wasted and misleading transmission has taken place.

According to the invention, arrangements are provided for timing the length of the different pulse signals and if any are received of less than a predetermined length, an alarm is given to indicate that the circuit has become unworkable. With this arrangement the error detecting operation is quite satisfactory even in the case of some start-stop codes in which, though the start element and the various character elements are all of the same length, the stop element is longer. In synchronous systems this point does not normally arise since all the elements are of equal length.

In a preferred form of the invention, the timing operation is carried out electronically by the use of two single-shot multivibrators having a relaxation time less than a predetermined minimum signal length. A mark-to-space transition operates one of the multivibrators which then applies an input to a gate circuit which is opened due to the subsequent space-to-mark transition. Similarly the multivibrator operated by the space-to-mark transition produces an input which is applied to a gate opened by the subsequent mark-to-space transition. Thus during normal working, each multivibrator is returned to its initial condition and removes the input before the appropriate gate is opened on the next transition and consequently no signal passes to the alarm equipment. If, however, a signal of either polarity is of less than the predetermined length, the multivibrator concerned will not have restored when the signal terminates and thus the input is still available when the reverse transition takes place to open the gate and hence a signal is transmitted to the error detecting circuit. This may include a trigger valve having an alarm relay in its anode circuit which accordingly remains operated until some further action is taken. Alternatively, the relay could be arranged to complete a locking circuit for itself depending upon a release key.

Figure 2:
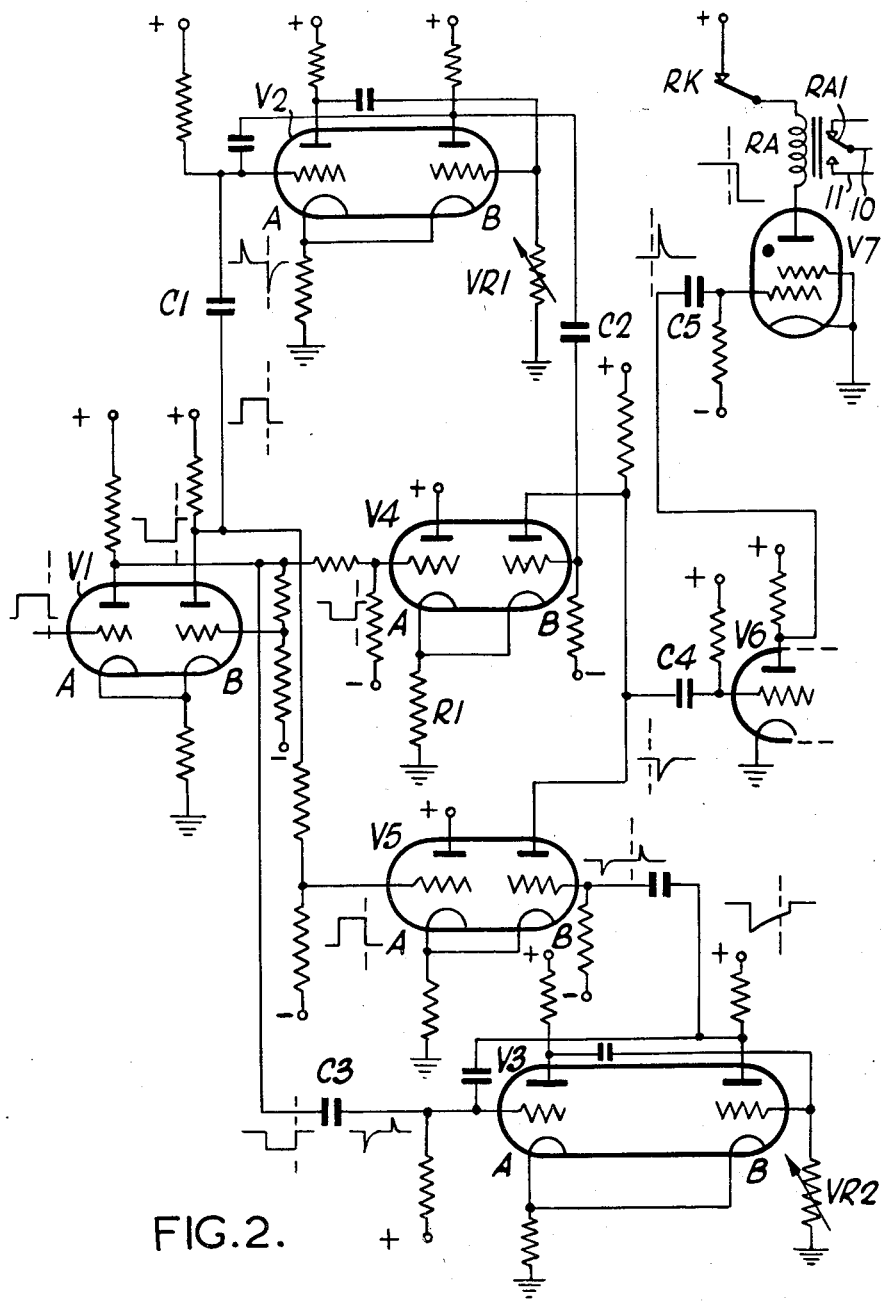

The preferred form of the invention just referred to will be more fully appreciated from the following detailed description taken in conjunction with the accompanying drawings comprising Figs. 1–3. Fig. 1 is a block schematic indicating the general method of working and showing the waveforms present in the portions of the circuit connecting the different blocks. Fig. 2 is the corresponding circuit diagram and again shows the various waveforms. In both cases the dotted line on these waveforms represents the instant of termination of an unacceptably short signal. Fig. 3 shows the various waveforms somewhat extended and assembled together so that their relationship may be better appreciated.

The equipment includes five toggle circuits V1–V5 which are basically similar and may each comprise a double triode in a single envelope. The toggle V1 responds to the input signals so as to be in its A condition, i.e. the A side conducting, corresponding to mark and in its B condition corresponding to space. Assuming start-stop operation, so that when no transmission is taking place the circuit is in the mark condition, when a character is received, the space condition occurs due to the start element and the toggle V1 is operated to the B condition. Thereupon the toggle V2, which is arranged as a single-shot multivibrator with a relaxation time equal to the predetermined minimum signal length, is changed over to its B condition and thus provides an input to the gate represented by the toggle V4. This gate, however, is now in its A or closed condition so that no output is obtained. If, however, the signal is of less than the predetermined minimum length, the toggle V1 will be restored to its A condition before the toggle V2 and consequently the A output from V1 will open the gate V4 by establishing the B condition and permit the B output from V2 to extend to the pulse amplifier V6. This then operates the gas filled triger V7 to energise the output relay RA which gives an alarm.

The operation is similar in respect of short mark signals, namely that if the multivibrator V3, which operated at the beginning of the mark signal, has not restored at the end of the signal, the output from the B condition of V1 opens the gate V5 and permits the B output of V3 to pass to the pulse amplifier V6.

Considering now the detailed circuits of Fig. 2, it will be assumed that an ordinary teleprinter start-stop code is being considered so that in the absence of signals the current flowing over the line represents mark. In these circumstances, the left-hand or A side of the double triode V1 is conducting and accordingly the anode of the right-hand or B side is at high potential and accordingly the potential applied to the grid of the A side of valve V5 is sufficient to cause this portion to conduct. Similarly, the anode of the A side of valve V1 is at a reduced potential and consequently the A side of valve V4 is unable to conduct and the B side also is non-conducting. The multivibrators V2 and V3 are both in the normal state in which the left-hand or A sides are conducting.

When the signal changes to space, the potential on the grid of V1A is reduced and it becomes non-conducting and V1B now conducts due to the raising of its grid potential and the lowering of its cathode potential when V1A no longer conducts. The change in the anode potential of V1 causes a changeover in the conditions of valves V4A and V5A so that V4A is conducting and V5A is non-conducting. The reduction in the potential of the anode of V1B transmits a negative pulse by way of capacitor C1 to the grid of the multivibrator V2 causing it to change over so that the B side conducts and remains conducting for a predetermined time in accordance with the setting of the variable resistor VR1. As a result a negative pulse is sent by way of capacitor C2 to the grid of V4B. The multivibrator V3 receives a positive-going pulse by way of capacitor C3 and this is ineffective to produce any change.

At the end of the time for which it is set, the multivibrator V2 will restore to its normal or A condition and a positive-going pulse will be transmitted by way of capacitor C2 to the grid of valve V4B. If the line signal is still space at this instant as it will be if satisfactory transmission is taking place, valve V4A will still be conducting and consequently in view of the common cathode resistor R1, valve V4B is unable to conduct. At the end of the signal when the line current again changes to mark, the valve V1 returns to its A condition and the condition of valves V4 and V5 is changed over. Hence if the signal is badly distorted so as to be unduly shortened and V4A is now non-conducting, the positive pulse on the grid of V4B will cause it to conduct momentarily and its anode potential will be therefore momentarily reduced. This negative-going pulse is passed by way of capacitor C4 to the grid of the amplifying valve V6 which was previously conducting, with the result that it becomes non-conducting and a corresponding positive-going pulse is transmitted from its anode by way of capacitor C5 to the grid of the gas filled trigger valve V7. In consequence this valve becomes conducting and operates the relay RA in its anode circuit. This changes over the contacts RA1 so as to complete a suitable alarm circuit over leads 10 and 11. The valve V7 remains conducting after the pulse ceases and can only be released by the opening of contacts RK which may be operated by a release key. Alternatively the valve V7 could be of the vacuum type and the relay RA arranged to complete a locking circuit for itself dependent upon normally closed release key contacts.

It will be appreciated that valves V3 and V5 in combination operate similarly in respect of unduly short mark signals, i.e. signals of the reverse polarity and similarly produce a negative-going pulse to the grid of valve V6.

The relaxation time of the multivibrator V3 can be adjusted by means of the variable resistor VR2 and for most purposes the relaxation times of the two multivibrators will be arranged to be the same. It is clear however that they could be different if the circumstances of the signalling circuit required it.

Reference may now be made to Fig. 3 in which the various waveforms shown in different places on the circuit of Fig. 2 are assembled so that their time relationship may be more readily appreciated. Of the 13 curves shown, the first represents the line current or the waveform which is applied to the grid of V1A, curves 2 and 3 represent the corresponding potentials of the anodes of V1A and V1B and curve 4, which follows the signal transitions, shows the potential of the grid of V2A, curve 5 represents the potential of the anode of V2B and it will be seen that for each negative pulse in curve 4 this potential is reduced for a predetermined time period dependent on the value of the variable resistor VR1 regardless of the duration of the signals. Curve 6 represents the potential of the grid of V4B, that is to say the potential of the anode of V2B as shown in curve 5 but differentiated due to the presence of the capacitor C5. Curve 7 indicates the cathode potential of V4 which it will be appreciated is determined by the incoming signals and corresponds to the anode potential of V1A, curve 2. The signals shown include one which is appreciably less than the predetermined minimum value and this signal is terminated at the instant represented by the dotted line. With the signals assumed, the grid of V4B goes positive at a time when the cathode is also positive as shown in curves 6 and 7 and consequently no effect is produced in the anode potential of V4B as indicated by curve 8. Curve 9 is similar to curve 4 and shows the potential of the grid of V3A while curve 10 is similar to curve 5 and relates to the anode of valve V3B. Curve 11 indicates the potential of the grid of V5B and is similar to curve 6. Curve 12, which is similar to curve 7 and corresponds to curve 3, represents the cathode potential of V5. It will be seen that the short signal now results in the grid of V5B going positive while the cathode is negative so that this valve conducts momentarily and this produces a negative pulse from the anode as indicated in curve 13. This pulse is amplified by V6 and causes the operation of V7 as already described.

I claim:

1. In a double current telegraph system in which signalling is effected by successive reversals of polarity of the signalling current at instants which need to be separated by a minimum predetermined period to produce an acceptable signal, a timing device arranged to be returned to normal a predetermined time after it has been set in operation, means for initiating the operation of said timing device in response to a reversal of signalling current in one sense, a control device arranged to assume one or other of two conditions dependent on the polarity of the signal current, an alarm device, and means jointly controlled by said timing device and said control device only for operating said alarm device if a reversal of signalling current in the opposite sense takes place before said timing device has been returned to normal.

2. In a double current telegraph system in which the signalling condition is either mark or space, a first timing device arranged to be restored to normal a predetermined time after its operation has been initiated, means for initiating the operation of said first timing device in response to a mark-space transition, a second timing device arranged to be restored to normal a predetermined time after its operation has been initiated, means for initiating the operation of said second timing device in response to a space-mark transition, a first control device operated responsive to a space signalling condition, a second control device operated responsive to a mark signalling condition, an alarm device, and means for operating said alarm device due to the simultaneous operated condition of said first timing device and said second control device and also due to the simultaneous operated condition of said second timing device and said first control device.

3. In a double current telegraph system in which signalling is effected by reversals of polarity of the signalling current at instants which need to be separated by a minimum predetermined period to produce an acceptable signal, a first single-shot multi-vibrator having a relaxation time equal to the duration of said minimum predetermined period, a second single-shot multi-vibrator also having a relaxation time equal to the duration of said minimum predetermined period, means for triggering said first and second multi-vibrators respectively in response to successive reversals in the signalling current, a pair of electronic gate circuits which are opened respectively by signalling current of opposite polarity, an alarm device connected to the output of both of said pair of gate circuits, and means for operating said alarm device by supplying said pair of gate circuits respectively with inputs from the one of said first and second multi-vibrators which was not triggered by the reversal which opened the gate concerned.

4. In a double current telegraph system as claimed in claim 3 the arrangement whereby an input is only supplied to said gates from said multi-vibrators respectively when the multi-vibrator concerned restores at the end of its relaxation time.

5. A double current telegraph system as claimed in claim 3 in which each gate comprises a double triode with a common cathode resistor and said alarm device connected in one of the anode circuits, one half of said triode being conducting when the signal is of one polarity and the other half only being conducting to operate said alarm device when said one half is non-conducting and an output is obtained from the associated multivibrator.

References Cited in the file of this patent

UNITED STATES PATENTS

| | | |
|---|---|---|
| 2,552,174 | Holloway | May 8, 1951 |
| 2,712,038 | Carver | June 28, 1955 |
| 2,856,457 | Prior et al. | Oct. 14, 1958 |